(12) United States Patent
Crane et al.

(10) Patent No.: US 6,655,874 B2
(45) Date of Patent: Dec. 2, 2003

(54) METHOD AND APPARATUS FOR SLITTING FLEXIBLE PIPE IN AN UNDERGROUND BORE

(75) Inventors: Robert F. Crane, Oconomowoc, WI (US); Steven W. Wentworth, Brookfield, WI (US)

(73) Assignee: Earth Tool Company, L.L.c., Oconomowoc, WI (US)

( * ) Notice: Subject to any disclaimer, the term of this patent is extended or adjusted under 35 U.S.C. 154(b) by 0 days.

(21) Appl. No.: 09/839,255

(22) Filed: Apr. 20, 2001

(65) Prior Publication Data

US 2002/0153170 A1 Oct. 24, 2002

(51) Int. Cl.[7] ................................................. F16L 55/44
(52) U.S. Cl. ................. 405/184.3; 405/156; 405/184.1; 405/184.2; 405/184.4; 175/22; 175/53; 254/30.31
(58) Field of Search .......................... 405/156, 184.1, 405/184.2, 184.3, 184.4, 154, 157, 174, 177, 184; 175/22, 53; 254/30.31, 29 R

(56) References Cited

U.S. PATENT DOCUMENTS

| | | | |
|---|---|---|---|
| 3,181,302 A | * | 5/1965 | Lindsay |
| 4,930,542 A | * | 6/1990 | Winkle et al. ................. 138/97 |
| 4,983,071 A | | 1/1991 | Fisk et al. ................... 405/154 |
| 5,078,546 A | | 1/1992 | Fisk et al. ................... 405/156 |
| 5,098,225 A | | 3/1992 | Rockower et al. .......... 405/156 |
| 5,171,106 A | | 12/1992 | Rockower et al. .......... 405/156 |
| 5,302,053 A | * | 4/1994 | Moriarty ..................... 166/55.2 |
| 5,328,297 A | * | 7/1994 | Handford .................... 405/184 |
| 5,413,385 A | * | 5/1995 | Hilbush, III ................. 264/32 |
| RE35,542 E | | 6/1997 | Fisk et al. ................... 405/156 |
| 5,997,215 A | * | 12/1999 | Schwert ....................... 175/53 |
| 6,171,026 B1 | * | 1/2001 | Crane et al. ................ 405/156 |
| 6,499,912 B2 | * | 12/2002 | Coon ....................... 405/184.3 |

OTHER PUBLICATIONS

Earth Tool CO., "Hammerhead–Pipe Bursting", ®2002, retrieved from the internet www.hammerheadmole.com/content/prod_pipeburst.htm, retrieved on Aug. 7, 2002, 3 pages.*

Vermeer Full–Line Catalogue, "Trenchless Products", ®2001, retrieved from the internet www.vermeer.com/, retrieved on Aug. 7, 2002, 19 pages.*

* cited by examiner

*Primary Examiner*—Heather Shackelford
*Assistant Examiner*—Katherine Mitchell
(74) *Attorney, Agent, or Firm*—Philip G. Meyers

(57) ABSTRACT

A method of slitting a flexible conduit in an underground bore, the conduit having entry and exit ends thereof exposed for access, includes: (1) fitting a retainer to flexible underground conduit adjacent to the entry end thereof, the retainer securing the flexible conduit to limit longitudinal movement thereof relative to the bore, (2) passing pulling means through the flexible conduit; (3) connecting the pulling means to a pipe slitter, and (4) pulling the pipe slitter through the retainer and flexible conduit to slit the conduit, the retainer holding the flexible conduit taut as the slitter passes through the conduit. In one embodiment, the retainer is a shoring clamp assembly including a pair of ring clamps that are secured onto a split end of the flexible conduit and transfer the longitudinal forces applied to the conduit during the slitting operation to an adjacent structure such as a pit wall, thereby holding the conduit taut during the slitting operation.

22 Claims, 6 Drawing Sheets

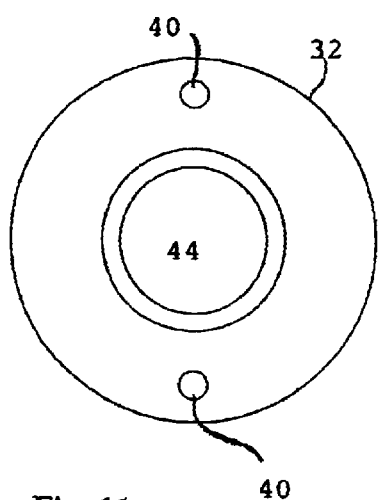
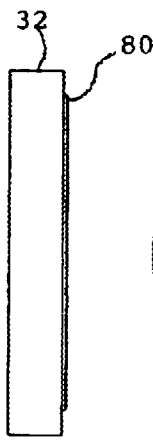
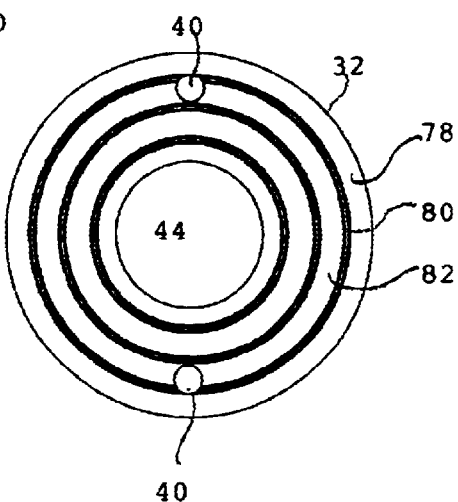
Fig. 11
Fig. 12
Fig. 13
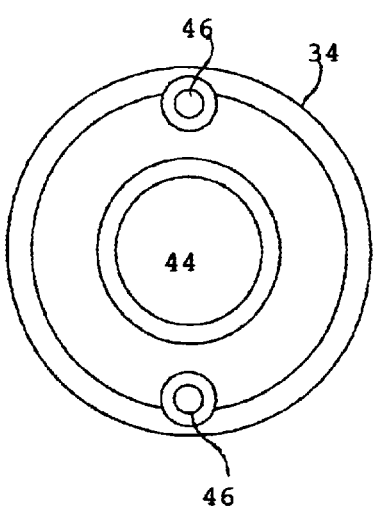
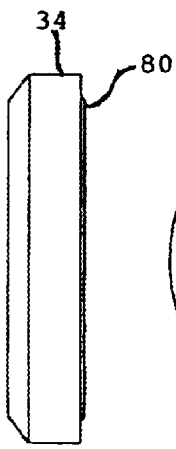
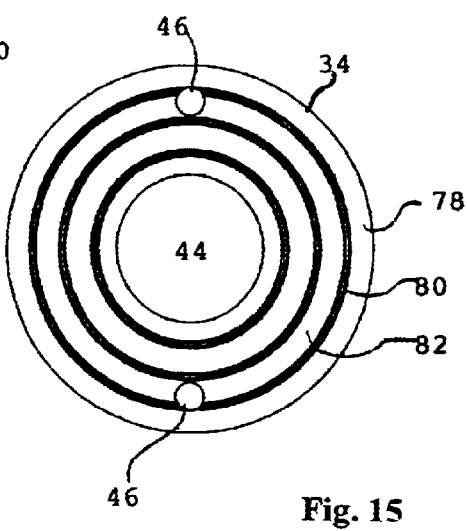
Fig. 14
Fig. 16
Fig. 15

METHOD AND APPARATUS FOR SLITTING FLEXIBLE PIPE IN AN UNDERGROUND BORE

TECHNICAL FIELD

The invention relates to an apparatus and method for slitting underground conduits, and in particular to slitting flexible underground pipes formed from plastics, thermoplastics, rubbers and ductile metals.

BACKGROUND OF THE INVENTION

A variety of systems are known for splitting rigid underground pipe made from concrete or cast iron. Typically, such methods make use of a slitting wedge or knife that is drawn through the pipe with a cable or chain attached to a winch or a piece of mobile equipment. In the case of pipe formed from relatively brittle materials such as concrete or cast iron, an impact hammer is attached to the wedge to aid in splitting and/or bursting the pipe. In some instances, new pipe is attached to the splitting tool and simultaneously pulled through the bore as the old pipe is burst or slit.

In one widely practiced method, a pneumatic impact boring tool such as a "Hammerhead Mole" (a registered trademark of Earth Tool Co.) boring tool is sent through the existing pipeline such that the head of the tool, which may be provided with blades that apply intense local pressure to the existing pipe, fractures or splits the existing pipe. See Streatfield et. al., U.S. Pat. Nos. 4,720,211, 4,738,565 and 4,505,302. A replacement pipe, typically made of plastic such as HDPE (High Density Polyethylene), can be drawn along behind the boring tool. Pneumatic impact boring tools are well known and are, for example, described in Wentworth et al. U.S. Pat. Nos. 5,025,868 or 5,337,837. The Streatfield et al. process has proven effective commercially because it bursts the old pipe into a multitude of fragments and replaces it with a new pipe at the same time. However, the Streatfield et al. method is less effective on ductile or non-frangible pipes such as copper, lead and certain types of plastic, such as HDPE.

One method for replacing existing underground pipelines is described in U.S. Pat. No. 6,171,026, issued to Crane et al. and assigned to Earth Tool Company, L.L.C., of Oconomowoc, Wis., the disclosure of which is incorporated herein by reference for all purposes. Briefly, the method includes creating open access to opposite ends of an existing pipeline to form an entry opening and an exit opening and mounting a wedge on a cable. The cable is threaded through the existing pipeline and the wedge is positioned at one of the ends of the existing pipeline after which the wedge is pulled through the pipeline from the other end of the existing pipeline so that the wedge slits the existing pipeline to form a slit pipe in the borehole. After the slit pipe is removed from the borehole, a replacement pipeline is pulled into the borehole.

The above described methods have not however, proven satisfactory in all cases. In some cases the methods have been ineffective in splitting underground conduits formed from relatively flexible materials such as high density polyethylene. This is especially in the case of relatively small diameter pipes, on the order of from one-half inch to about eight inches in diameter. The invention described below provides a means of alleviating and overcoming the difficulties encountered in splitting relatively small diameter underground pipes and conduits.

SUMMARY OF THE INVENTION

The invention provides method of slitting a flexible conduit in an underground bore, the conduit having entry and exit ends thereof exposed for access, including (1) fitting a retainer to flexible underground conduit adjacent to the entry end thereof, the retainer securing the flexible conduit to limit longitudinal movement thereof relative to the bore, (2) passing pulling means through the flexible conduit, (4) connecting the pulling means to a pipe slitter, and pulling the pipe slitter through the retainer and flexible conduit to slit the conduit, the retainer holding the flexible conduit taut as the slitter passes through the conduit. A slitter nose guide may be positioned on the pulling means ahead of the slitter to aid in maintaining the alignment of slitter in the pipe during the slitting operation.

In one aspect of the method, the retainer comprises a shoring clamp assemble adapted to be secured to the end of the flexible conduit and the method includes securing the clamp assembly onto the conduit. In this aspect the method may be implemented by splitting the entry end of the pipe with a saw or similar tool after which the shoring clamp is clamped onto a split end of the pipe. The clamp assembly may comprise a two piece assembly, such as a pair of ring clamps wherein at least one split end of the flexible conduit is positioned between the pieces which are clamped onto the split end by bolting or screwing the clamps together. An expander may be used with the slitter to expand the bore, and in some cases multiple passes through the bore may be made with larger expanders to further increase the size of the borehole. A replacement pipe may also be attached to the slitter, in which case the replacement pipe is pulled behind the slitter through the retainer and the bore in a single pass application of the method.

In yet another aspect of the invention, an apparatus for slitting a flexible conduit in an underground bore includes a pipe slitter and retaining means adapted to be fastened to an entry end of the flexible conduit. The retaining means includes an opening therethrough for passage of the pipe slitter therethrough and into the conduit and serves to limit longitudinal movement of the conduit relative to the bore as the pipe slitter is pulled through the conduit. A pulling apparatus such as a winch or a piece of mobile equipment is positioned adjacent to an exit opening of the conduit to pull the slitter through the conduit. A flexible pulling means for connecting the slitter to the pulling apparatus through the conduit may comprise a cable, rope, chain or rod.

In this aspect, the retaining means is preferably a pair of ring clamps adapted to be secured on the end of the pipe, although clamps have other geometries that may be used. The ring clamps are adapted to clamp a split end of the conduit between them to limit longitudinal movement of the flexible collar by transferring longitudinal forces applied to the flexible conduit to a wall of a pit adjacent to the entry end of the flexible conduit. The clamps are configured with a central opening that is large enough to accommodate the slitter, allowing it to pass through the opening into the pipe to be slit. The slitter may also include an expander and/or adapter for attaching a replacement pipe if the replacement pipe is to be pulled behind the slitter through the bore. Additionally, the slitter may be provided with a hollow, cylindrical nose guide for maintaining the alignment of the slitter in the flexible conduit during the slitting operation.

BRIEF DESCRIPTION OF THE DRAWINGS

In the accompanying drawings, like numerals represent like elements except where other wise indicated:

FIGS. 11–13 are front, side and back views of a back ring-shaped half of the shoring retainer of FIGS. 5 and 6 including a pair of threaded apertures positioned 180° apart; and FIGS. 14–16 are front, side and back views of a front ring-shaped half of the shoring retainer of FIGS. 5 and 6 including a pair of bolt holes positioned for alignment with the threaded apertures illustrated in FIGS. 11 and 13.

DETAILED DESCRIPTION

While the making and using of various embodiments of the present invention are discussed in detail below, it should be appreciated that the present invention provides many applicable inventive concepts which can be embodied in a wide variety of specific contexts. The specific embodiments discussed herein are merely illustrative of specific ways to make and use the invention and do not delimit the scope of the invention.

Buildings supplied with municipal water or natural gas are typically connected to a main pipeline that supplies gas or water to the general area with a small diameter pipe known as a service connection. These connections are typically made with a flexible conduit or pipe such as plastic, copper, steel or lead pipe. As used herein, the term "flexible conduit" includes pipes made from synthetic materials such as plastics, rubbers and thermoplastics possessing sufficient flexibility so that each half of a split end portion of the pipe may be bent at an angle sufficient to allow the split portions of the pipe to be clamped in a retainer as described hereinafter without breaking. "Flexible underground conduit" also refers to ductile metal pipes such as copper, steel and lead having a similar degree of flexibility as the plastic conduit described above.

Replacement of service connections is common and may be required for a number of reasons. Water lines may develop leaks as the pipe forming the service connection deteriorates over time. Water lines may also lose flow capacity due to calcium buildup in the pipe. Older residential connections in the U.S. or Europe were typically made with plastic or copper for gas and plastic, copper or very commonly lead for water, in which case replacement of the line is required. Additionally, many HDPE gas line pipes installed in the 1960's proved to be defective and are now failing. These service lines are typically relatively small diameter pipes, for example a gas pipe may have an inside diameter as small as 0.38".

Figure 4:
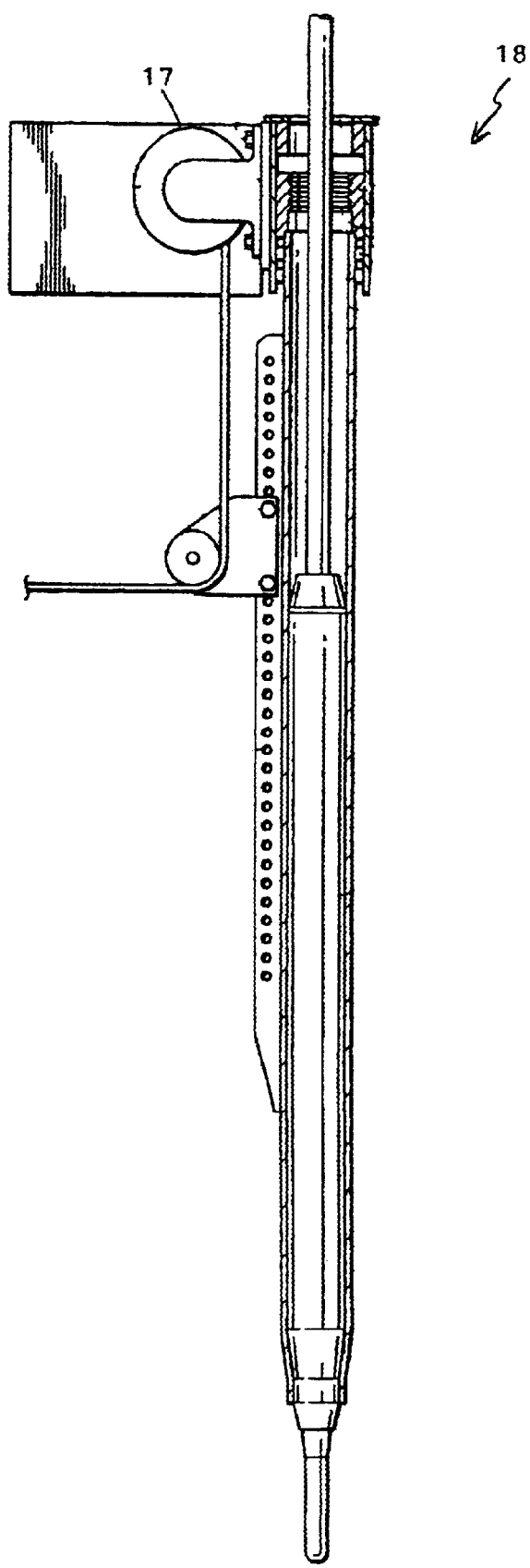
FIG. 4 is a side view in partial section of a pulling apparatus suitable for use in the invention.
Figure 5:
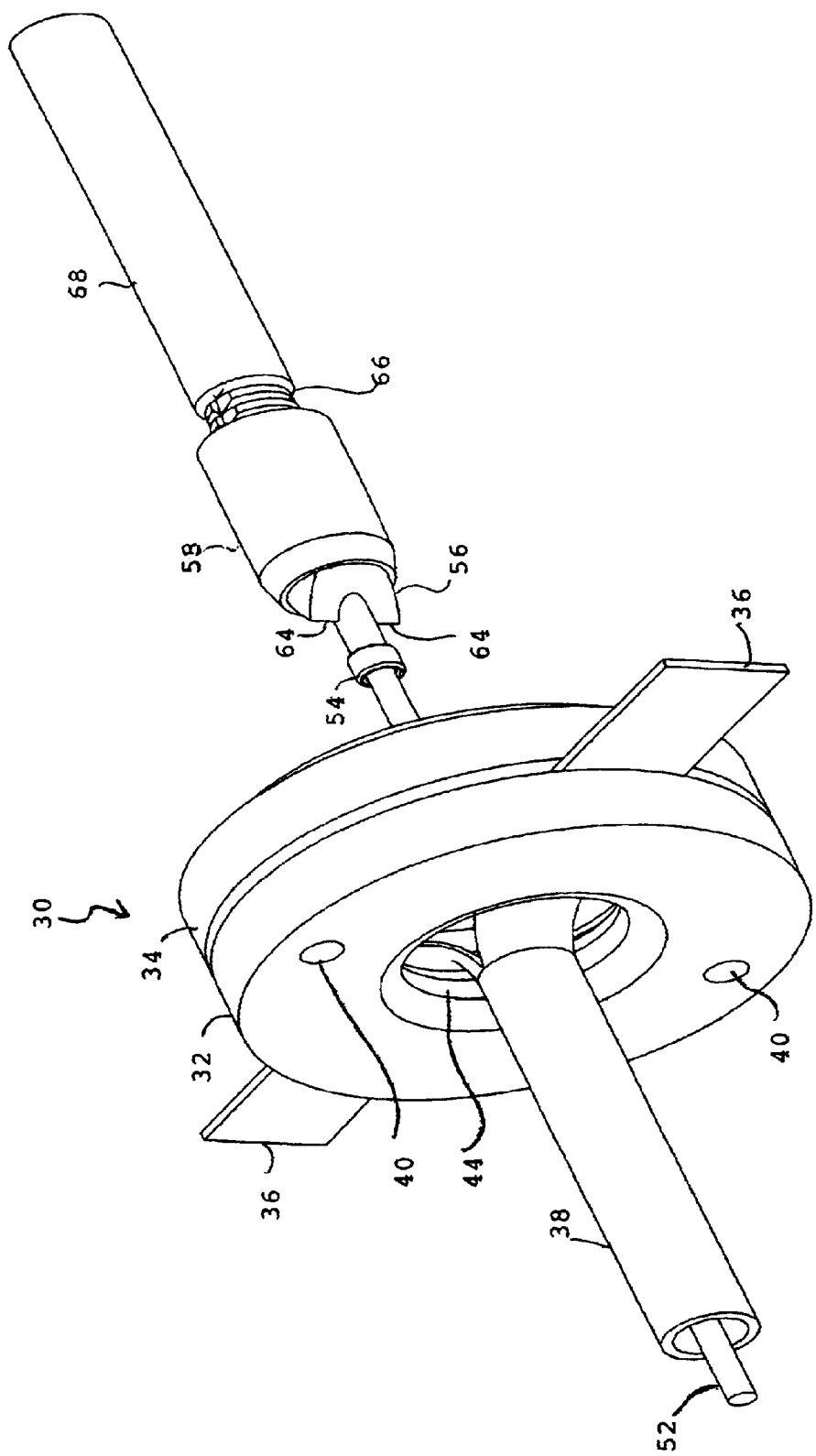
FIG. 5 is a front perspective view of a shoring retainer or clamp installed on the split end of a pipe to be slit with slitter positioned to being the slitting operation.
Figure 6:
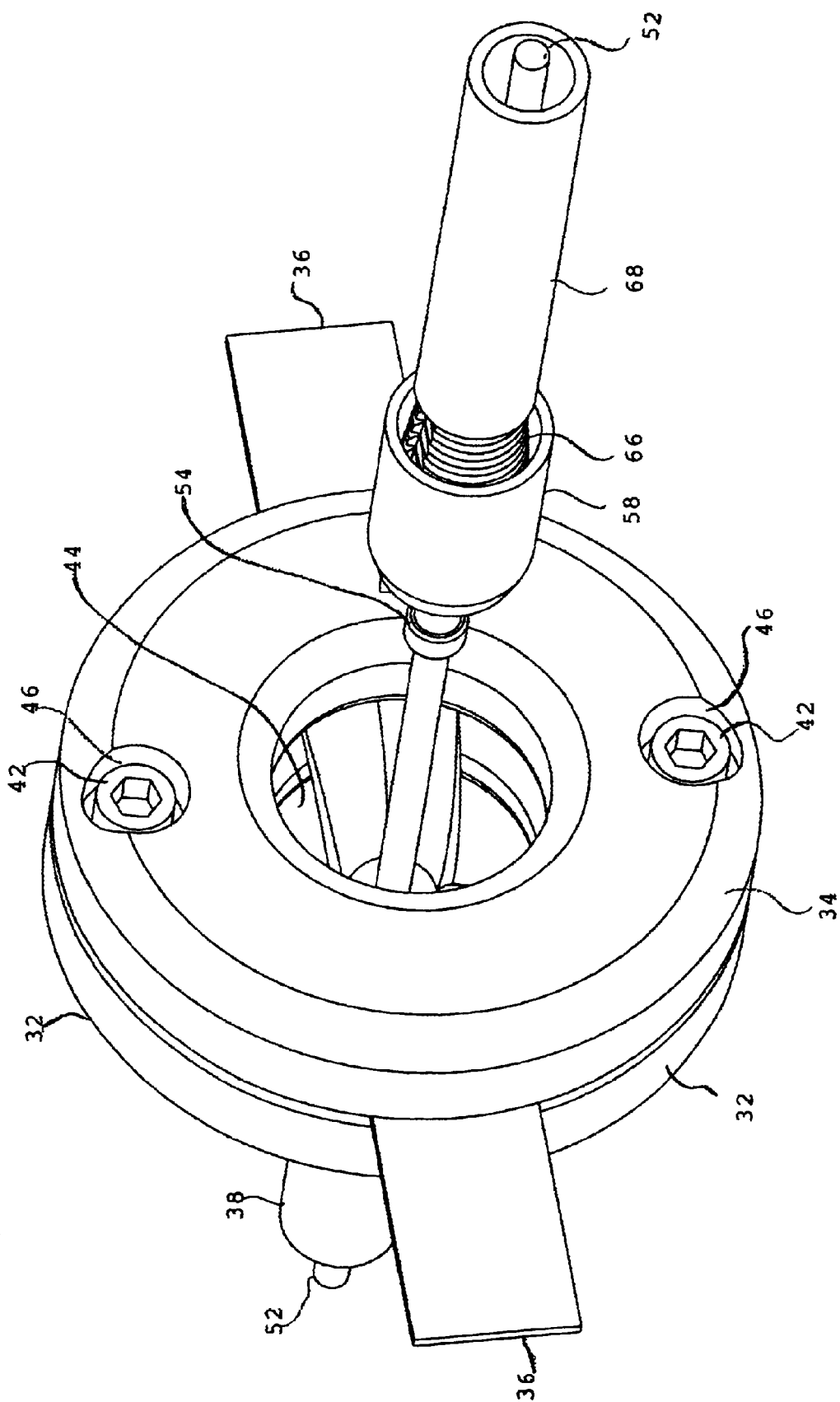
FIG. 6 is a rear perspective view of a shoring retainer or clamp installed on the split end of a pipe to be slit with slitter positioned to being the slitting operation.
Figure 9:
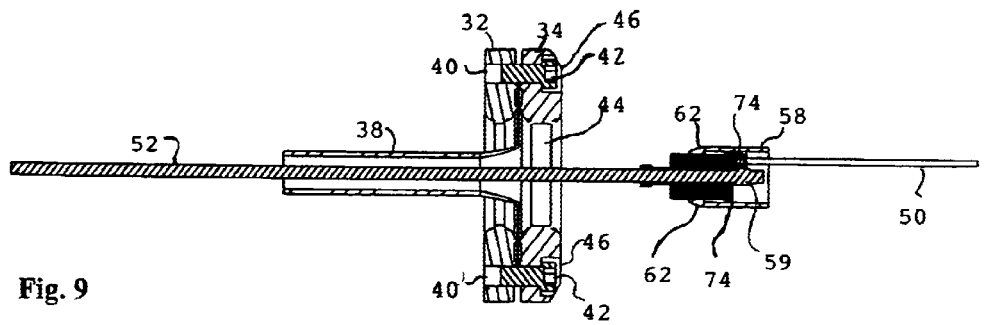
FIG. 9 is a cross sectional view taken along line A—A of FIG. 7.
Figure 8:
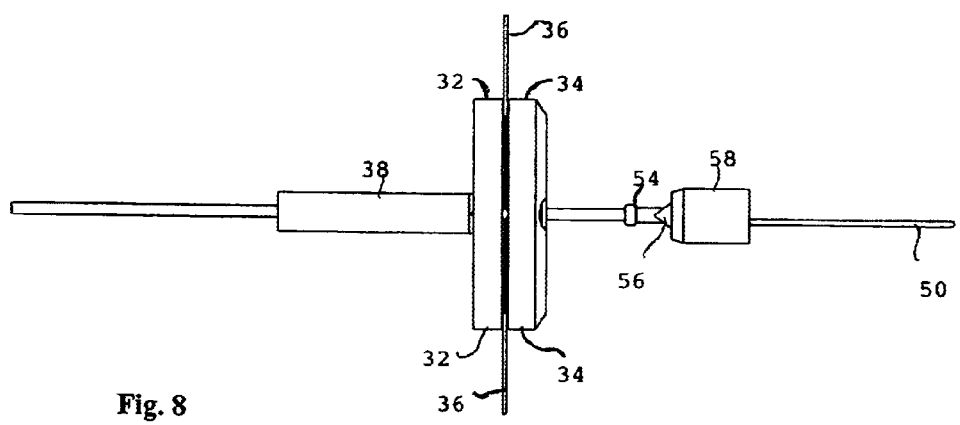
FIG. 8 is a second side view of the shoring retainer or clamp of FIG. 7 rotated 90° from the position in FIG. 7.
Figure 7:
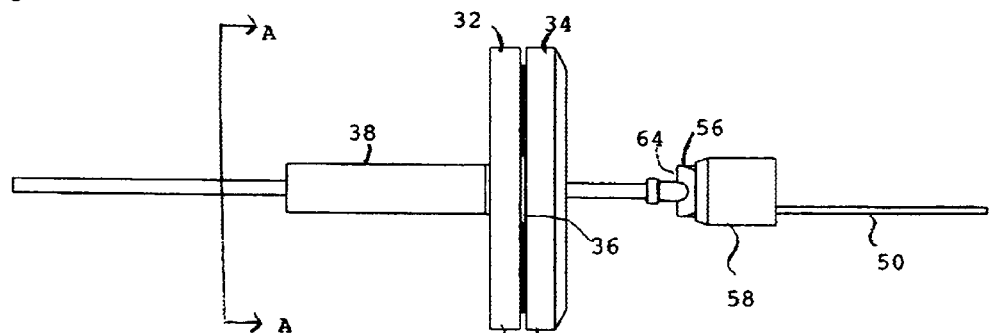
FIG. 7 is side view of the shoring retainer or clamp of FIGS. 5 and 6.
Figure 10:
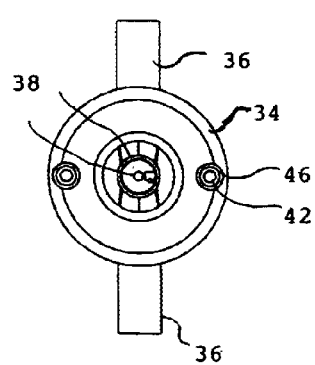
FIG. 10 is an end view of the shoring retainer of FIG. 8.

Referring now to FIGS. 1–5, one method for replacement of an existing pipeline 10 generally includes the steps of creating open access to opposite ends of the pipeline to form a bore bole entry opening (entry pit) 12 and a bore hole exit opening (exit pit) 14. Segments of the pipeline 10 in pits 12, 14 are removed to create an entry or front end opening 20 in pit 12 and an exit or rear end opening 21 in pit 14. A cable 16 is threaded through the existing pipeline 10 and positioned in entry pit 12 near one end of the existing pipeline for installation of a wedge-like cutter or slitter (not shown). The cutter is pulled through pipeline 10 from front end opening 20 of the existing pipeline 10 with a winch 15 so that the cutter slits the existing pipeline 10. A pulling apparatus including winch 18 suitable for the slitting operation is shown in FIG. 4 and described in detail in U.S. Pat. No. 6,171,026, incorporated herein by reference. A replacement pipe 22 may be pulled behind the cutter or the slit pipe 24 and may be removed from the borehole 26 and a replacement pipeline 22 pulled into the borehole after the slit pipe has been removed.

A problem frequently encountered in replacing flexible underground conduits in the manner described above is jamming and/misalignment of the pipe slitter in the pipe to be replaced. When the slitter jams in the flexible conduit, the pulling force on the slitter tends to break the conduit and or cause the slitter body to break through the conduit. It was determined that the jamming problem was the result of the flexible conduit flexing in the bore ahead of the slitter as the slitter was pulled though the pipe. Such flexing occurs when force created by the wedge splitting the pipe is greater than the frictional and compressive forces holding the pipe in place. This is especially the case in loose and or soft soils which allow the pipe ahead of the slitter to move laterally during the slitting operation or where a small diameter pipe passes through a larger diameter bore, also allowing the pipe to flex laterally. It was discovered that the jamming problems resulting from the pipe flexing could be overcome through the use of a retainer or shoring device that secures the entry end of the pipe, restraining the pipe against the forces tending to move the entry end of the pipe longitudinally.

Referring now to FIGS. 5–16 a pipe retainer 30 for use in connection of the method of the invention includes a pair of collar shaped shoring ring clamps 32, 34 adapted to grip the ends 36 of a split flexible pipe 38. Shoring ring clamp 32 includes a plurality of treaded holes or apertures 40 positioned in spaced apart relationship on ring clamp 32. Ring clamps or collars 32, 34 are fastened together with a plurality of fasteners such as bolts 42 that pass through holes 46 in shoring ring clamp 34. Bolts 42 engage threaded apertures 40 in shoring ring clamp 32, pulling shoring ring clamps 32, 34 together to compress and grip ends 36 of pipe 38. As shown, two bolts 42 positioned 180° apart are used to secure shoring ring clamps 32, 34 on ends 36 of pipe 38, however it will be appreciated that a greater or less number of fasteners 42 may be used to secure the shoring ring clamps together. It is also anticipated that alternative methods of fastening shoring ring clamps 32, 34 together may be employed. For example, shoring ring clamps 32, 34 could be clamped together with C clamps or a similar device or the central opening 44 in shoring ring clamps 32, 34 could be threaded so that the shoring ring clamps could be screwed together on a threaded rod or pipe nipple (not shown) having an outside diameter equal to the diameter of openings 44.

After pipe 38 has been slit, and ends 36 clamped between shoring ring clamps 32, 34, a pulling means such as a rope, chain or cable 52 is threaded through pipe 38, shoring ring clamps 32, 34, slitter pilot nose 54, wedge-shaped slitter 56 and expander 58. Slitter 56 is sized to pass through central opening 44 and is provided with a hollow cylindrical pilot nose 54 through which cable 52 passes. Pilot nose 54 aids in aligning slitter 56 in pipe 38 to prevent the slitter from catching on any joints, breaks or similar irregularities in pipe 38 in which case the pulling force applied to the slitter to slit the pipe may increase to the point that pipe 38 breaks instead of slitting. As shown, slitter 56 includes a wedge-shaped cutting end or blade 64 and adapter 66 for attaching a replacement pipe 68 to the slitter that can be pulled through a bore as pipe 38 is slit. A bead, knot or clamp 53 (FIG. 9) is used to retain cable 52 in place on cable 52. Alternatively, an insert (not shown) may be inserted into a loosened, enlarged diameter portion of the cable 52 to form a stop as described in U.S. Pat. No. 6,171,026.

Slitter 56 also includes an expander retaining flange 74 that extends around the circumference of the slitter between the wedge shaped cutting end or blade 64 and the threaded adapter 66. Expander 58 comprises a generally cylindrical body including a central opening 60 adapted to fit over slitter 56 and an annular retaining ring 62 that abuts flange 74 when the expander is slipped over slitter 56, retaining the expander on the slitter. Expander 58, which defines the size of the bore is generally cylindrical with a diameter longer than the length of the cutting edge of blade 64 and the diameter of replacement pipe 68. The slip on design of the expander allows the operator to select different sized expanders, depending upon the size of the replacement pipe and the ground conditions, in order to minimize the force required to pull slitter 56 through pipe 38 during the slitting operation. This design also allows the operator to make a first pass through pipe 38 with a first expander, re-thread cable 52 through pipe 38 and reinstall slitter 56 with a larger expander 58 and make a second and, if necessary, additional sequential passes to increase the size of the bore. Subsequent passes through the bore may be made as necessary to further increase the size of the bore. A small diameter rope, cord or string 50 may be clamped to the slitter as illustrated in Figure to aid in rethreading the cable 52 through the bore in the case where a second or multiple passes are desired or necessary.

Figure 1:
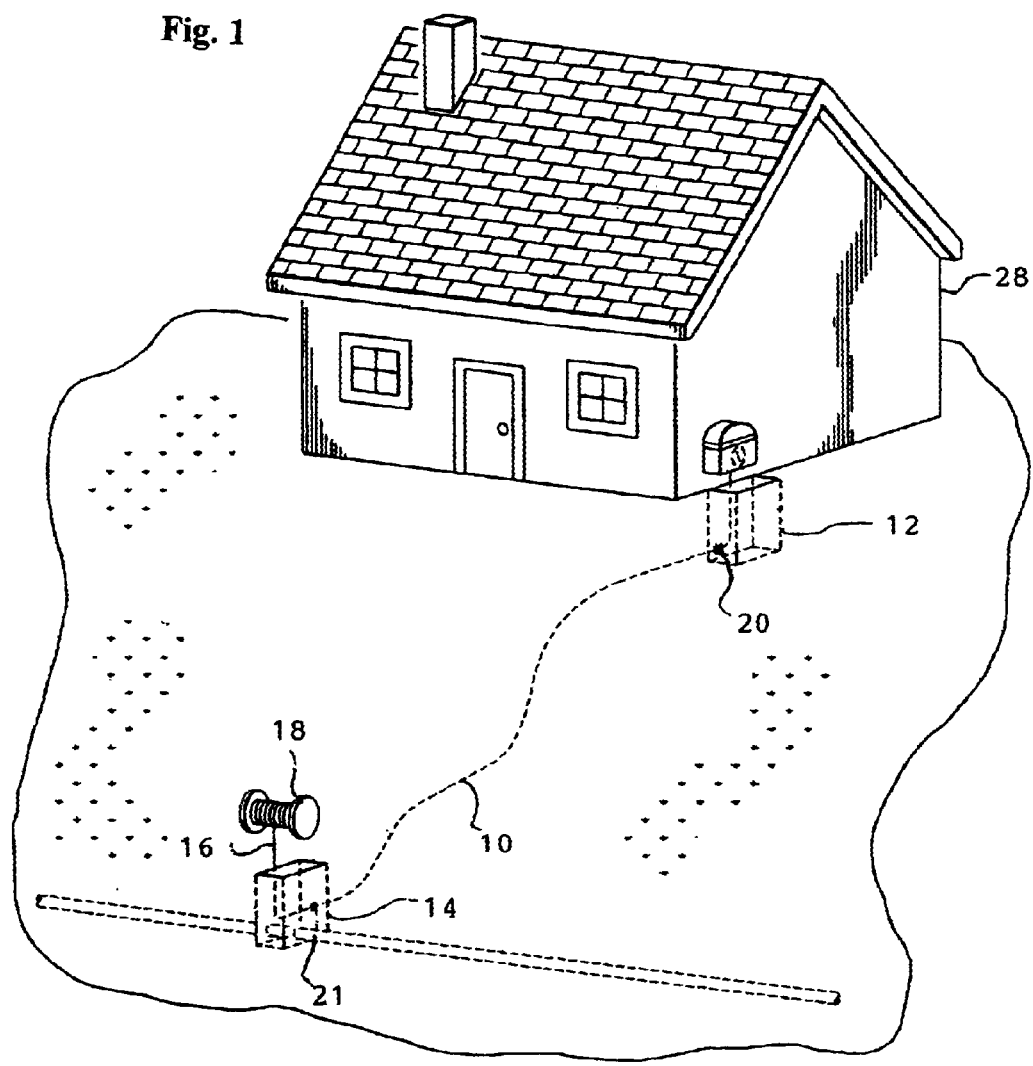
FIG. 1 is a schematic diagram of a pipe slitting operation in accordance with the invention.
Figure 2:
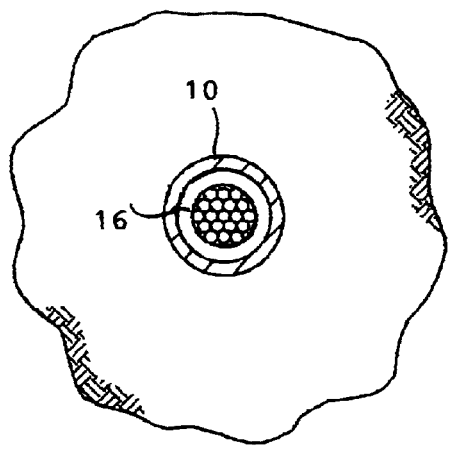
FIG. 2 is a cross sectional view of an existing underground pipeline with a slitter pulling cable passing therethrough.
Figure 3:
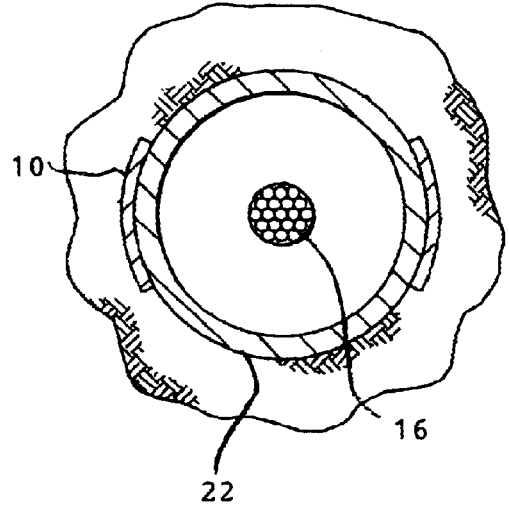
FIG. 3 is a cross sectional view of the pipeline of FIG. 2 after the pipeline has been slit and a replacement pipe pulled into the bore.

In one application, entry pit 12 is dug at an outside wall of the residence, structure or building 28 at a location at which an existing pipe, for example gas line 10 enters a residence, structure or building, generally at gas meter 11. A first segment (not shown) of the gas line 10 which adjoins the residence 11 is cut with a pipe cutter or saw and manually removed to expose an open front end 20 of the gas line at one side wall of entry pit 12. A second pit 14 is dug at the location where the gas line 10 connects to the gas main 13 and a second segment (not shown) of gas line 10 which adjoins the gas main 13 is removed to expose a rear open end 21 of the gas line. One of shoring ring clamps 32, 34 is slipped over the front end 20 of the pipe and positioned against the side of pit 12. Front end 20 of pipe 10 is then split longitudinally with a saw or similar tool to form ends 36 (FIG. 1) of sufficient length to fold outwardly over ring claim 32. Preferably, the ends 36 are cut sufficiently long so that the ends extend beyond the outer edge of ring clamp 32 as shown in FIGS. 1 and 2. After the ends 36 are folded outwardly over ring clamp 32, ring clamp 34 is then bolted to ring clamp 32, clamping pipe ends 36 between the ring clamps. To aid in clamping pipe ends 36 between shoring ring clamps 32, 34, opposing faces 78 of ring clamps 32, 34 may include a series of ridges and grooves 80, 82 as shown in FIGS. 11–16. Additionally, while shoring ring clamps 32, 34 are illustrated as having ring-like geometry, it will be appreciated that shoring clamps with a different geometry, for example rectangular, C-shaped or U-shaped clamps could be used in the practice of the invention.

Before or after pipe retainer 30 is installed on pipe 10, winch 18 is installed in exit pit 14 in the manner described in U.S. Pat. No. 6,171,026. Cable 52 is then threaded through pipe 10 between pits 12 and 14. A free end of the cable in pit 12 is then threaded through slitter pilot nose 54, wedge-shaped slitter 56 and the expander 58 selected for the particular pipe 10 and replacement pipe 22. A stop 53 as previously described is formed in cable 52 to retain slitter 56 in position on the cable. Winch 18 is then actuated, taking up any slack in cable 52. Preferable blade 64 of slitter 56 is aligned with the cuts in pipe 10 previously made to form ends 36 as the slitter is pulled through shoring ring clamps 32, 34 to facilitate the initial entry of slitter 56 into pipe 10. As pipe 10 is slit, slitter 56 pushes against the pipe, exerting a longitudinal pushing force against the pipe between the slitter and exit pit 14. Slitter 56 simultaneously pulls the slit pipe behind the slitter in the direction of travel of cable 52. The pushing and pulling forces thus applied to pipe 10 tend to cause the pipe to flex in front of slitter 56, causing the slitter to become misaligned and jam in the pipe. In the practice of the invention however, the forces applied to the pipe are transferred to shoring clamp assembly or retaining device 30 which transfers the forces to the wall of pit 12, holding the flexible conduit taut during the slitting process. Shoring clamp assembly 30 thereby holds entry end 20 of pipe 10 in place, preventing the segment of pipe 10 behind slitter 56 from moving longitudinally in the bore with slitter 56. Restraining the entry end 20 of pipe 10 with pipe retainer 30 in this manner prevents the pipe in front of the slitter from being compressed and flexing, allowing the slitter to progress without jamming.

After pipe 10 has been slit, replacement pipe 22 is installed in bore 26 in one of several ways. One approach is to couple the replacement to adapter 66 of slitter 56 and pull the replacement pipe through bore 26 with the slitter, either in a single pass or if conditions dictate, in a final one of a series of successive passes through the bore. The slit pipe is left in the bore. Alternatively, after pipe 10 is slit, a replacement pipe is coupled to an end of the slit pipe, or a longitudinal slit section of the pipe. The slit pipe is then pulled from the bore, pulling the replacement pipe into the bore. Yet another alternative is to connect cable 52 to an end of the slit pipe, pull the slit pipe from the bore with the cable, connect the replacement pipe to the cable and pull the replacement pipe into place. Once installed, the replacement pipe is reconnected at ends 20 and 21, the shutoff valves are opened and service is resumed. Although the method as described utilizes a winch for pulling the slitter through the pipe, it will be appreciated that other means, such as a truck, tractor or backhoe may be used to pull the slitter. Also, under some instances, it may be desirable to place shoring between the wall of the pit and pipe retainer 30 to aid in holding the conduit taut during the slitting operation.

While certain embodiments of the invention have been illustrated for the purposes of this disclosure, numerous changes in the method and apparatus of the invention presented herein may be made by those skilled in the art, such changes being embodied within the scope and spirit of the present invention as defined in the appended claims.

What is claimed is:

1. A method of slitting a flexible conduit in an underground bore, the conduit having entry and exit ends thereof exposed for access, comprising:

fitting a retainer to a flexible underground conduit adjacent to the entry end thereof, the retainer securing the flexible conduit to limit longitudinal movement thereof relative to the bore;

passing pulling means through the flexible conduit;

connecting the pulling means to a pipe slitter;

pulling the pipe slitter through the retainer and flexible conduit to slit the conduit, the retainer holding the flexible conduit taut as the slitter passes through the conduit.

2. The method of claim 1 wherein the retainer comprises a shoring clamp assembly adapted to be secured to the end of the flexible conduit and wherein the method further comprises securing the clamp assembly onto the conduit.

3. The method of claim 2 wherein the shoring clamp assembly is adapted to be secured to a split end of the conduit and wherein the method further comprises splitting the end of the flexible conduit and securing the clamp assembly onto a slit end of the conduit.

4. The method of claim 3 wherein the shoring clamp assembly is a two piece assembly and wherein the method further comprises positioning at least one split end of the flexible conduit between the pieces and clamping the pieces together onto the split end.

5. The method of claim 4 wherein each of the pieces is a ring clamp and the method further comprises bolting the ring clamps together with at least one split end of the conduit positioned between the rings.

6. The method of claim 1 further comprising digging a pit to access the entry end of the flexible conduit, removing a segment of the flexible conduit and fitting a shoring ring clamp over the exposed entry end of the conduit.

7. The method of claim 1 wherein the method further comprises expanding the bore through which the conduit extends as the conduit is slit.

8. The method of claim 7 further comprising making a second pass through the bore with a second expander sized to further expand the bore after a first pass through the bore with the slitter.

9. The method of claim 1 further comprising attaching a replacement pipe to the slitter and pulling the replacement pipe behind the slitter as it slits the conduit.

10. A method of slitting a flexible conduit in an underground bore, the conduit having entry and exit ends thereof exposed for access in an entry and exit pit, comprising:

splitting an end of the flexible conduit adjacent to a wall of the entry pit to form a plurality of split ends;

clamping the split ends between a pair of ring clamps, the ring clamps being positioned adjacent to a wall of the entry pit;

passing a cable through the flexible conduit from the entry pit to the exit pit;

threading the cable through a pipe slitter and a pipe slitter guide:

pulling the pipe slitter through a central opening in the ring clamps and through the flexible conduit from the entry pit to the exit pit, the ring clamps limiting longitudinal movement of the flexible conduit as the slitter passes through the length of the conduit.

11. An apparatus for slitting a flexible conduit in an underground bore, the conduit having entry and exit ends thereof exposed for access, comprising:

a pipe slitter;

retaining means adapted to be fastened to the entry end of the flexible conduit, the retaining means securing the entry end of the flexible conduit to limit longitudinal movement of the conduit relative to the bore as the pipe slitter is pulled through the conduit, the retaining means having an opening therethrough for passage of the pipe slitter through the retaining means and into the conduit.

12. The apparatus of claim 11 further comprising a pulling apparatus positioned adjacent the exit opening of the flexible conduit.

13. The apparatus of claim 12 wherein the pulling apparatus is a winch.

14. The apparatus of claim 11 further comprising flexible pulling means extending through the flexible conduit and connected to the pulling apparatus for pulling the pipe slitter through the flexible conduit.

15. The apparatus of claim 11 wherein the flexible pulling means is one of a cable, rope, chain and rod.

16. The apparatus of claim 11 wherein the retaining means comprises a pair of ring clamps adapted to be secured on the end of the conduit.

17. The apparatus of claim 16 wherein the ring clamps are adapted to for attachment to a split end of the flexible conduit.

18. The apparatus of claim 11 wherein the entry end of the flexible conduit is positioned in an entry pit and the retaining means comprises a plurality of clamping members adapted to clamp over at least one split end of the flexible conduit and limit longitudinal movement of the flexible collar by transferring longitudinal forces applied to the flexible conduit to a wall of the pit adjacent to the entry end of the flexible conduit.

19. The apparatus of claim 18 wherein the clamping members comprise a pair of ring clamps with a central opening therethrough for passage of the slitter.

20. The apparatus of claim 11 further comprising an adapter for attaching a replacement pipe to the slitter.

21. The apparatus of claim 11 further comprising an expander adapted to fit over the slitter, the expander including an annular ring for retaining the expander on a flange on the slitter.

22. The apparatus of claim 11 further comprising a slitter nose guide adapted to maintain the alignment of the slitter as the slitter passes through the flexible conduit.

* * * * *